United States Patent
Kiss et al.

(10) Patent No.: US 11,299,561 B2
(45) Date of Patent: Apr. 12, 2022

(54) BIPHASIC POLYMERIZATION PROCESSES AND ETHYLENE-BASED POLYOLEFINS THEREFROM

(71) Applicant: ExxonMobil Chemical Patents Inc., Baytown, TX (US)

(72) Inventors: Gabor Kiss, Hampton, NJ (US); Thomas T. Sun, Clinton, NJ (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 0 days.

(21) Appl. No.: 16/743,824

(22) Filed: Jan. 15, 2020

(65) Prior Publication Data

US 2020/0255549 A1 Aug. 13, 2020

Related U.S. Application Data

(60) Provisional application No. 62/803,765, filed on Feb. 11, 2019.

(51) Int. Cl.
| | | |
|---|---|---|
| *C08F 10/02* | (2006.01) | |
| *C08F 2/06* | (2006.01) | |
| *C08F 2/01* | (2006.01) | |

(52) U.S. Cl.
CPC ............ *C08F 2/06* (2013.01); *C08F 2/01* (2013.01); *C08F 10/02* (2013.01); *C08F 2400/02* (2013.01)

(58) Field of Classification Search
CPC .... C08F 2/06; C08F 2/01; C08F 10/02; C08F 2400/02; C08F 2420/10; C08F 10/00; C08F 4/65908; C08F 110/02; C08F 210/16
USPC .......................................................... 526/90
See application file for complete search history.

(56) References Cited

U.S. PATENT DOCUMENTS

| | | | |
|---|---|---|---|
| 9,388,254 B2 | 7/2016 | Deshpande et al. | |
| 2005/0192416 A1 | 9/2005 | Friedersdorf | |
| 2013/0281643 A1* | 10/2013 | Deshpande | C08F 10/02 526/133 |
| 2016/0229930 A1 | 8/2016 | Price et al. | |
| 2018/0346610 A1* | 12/2018 | Brown | C08F 10/02 |

FOREIGN PATENT DOCUMENTS

| | | |
|---|---|---|
| EP | 2966096 | 1/2016 |
| WO | 97/22635 | 6/1997 |

OTHER PUBLICATIONS

Alamo et al., "Phase Structure of Random Ethylene Copolymers: A Study of Counit Content and Molecular Weight as Independent Variables", Macromolecules, vol. 26, No. 21, (19930 pp. 5740-5747.
Gutowski et al., "A Low-Energy Solvent Separation Method", Polymer Engineering and Science, vol. 23, No. 4, pp. 229-237, Mar. 1983.
Han et al., "Short Chain Branching Effect on the Cloud-Point Pressures of Ethylene Copolymers in Subcritical and Supercritical Propane", Macromolecules, 1998, vol. 31, pp. 2533-2538.
Irani et al., "Lower Critical Solution Temperature Behavior of Ethylene Propylene Copolymers in Multicomponent Solvents", Journal of Applied Polymer Science, vol. 31, pp. 1879-1899 (1986).
McHugh et al., "Separating Polymer Solutions with Supercritical Fluids", Macromolecules, 1985, vol. 18, No. 4, pp. 674-680.
Taneka, "Critical dynamics and phase-separation kinetics in dynamically asymmetric binary fluids: New dynamic universality class for polymer mixtures or dynamic crossover?", Journal of Chemical Physics, vol. 100, No. 7, Apr. 1, 1994, pp. 5323-5337.
"High Temperature Olefin Polymerization Process", Research Disclosure, Kenneth Mason Publications, Hampshire, UK, GB, No. 388, Aug. 1, 1996, pp. 495-496.

\* cited by examiner

*Primary Examiner* — Robert S Jones, Jr.

(57) ABSTRACT

A continuous process for preparing an ethylene-based polyolefin, the process comprising maintaining a polymerization mixture at a temperature at or above the lower critical phase separation temperature of the polymerization mixture, while, during said step of maintaining, maintaining the polymerization mixture at steady state, where the polymerization mixture is substantially uniform in temperature, pressure, and concentration, where the polymerization mixture includes solvent, monomer including ethylene and optionally monomer copolymerizable with ethylene, a single-site catalyst system, and polymer resulting from the polymerization of the monomer, where the monomer and the polymer are dissolved in the solvent, and where the polymer is an ethylene-based polyolefin having a molecular weight distribution (Mw/Mn) of less than 2.30.

25 Claims, No Drawings

BIPHASIC POLYMERIZATION PROCESSES AND ETHYLENE-BASED POLYOLEFINS THEREFROM

CROSS-REFERENCE TO RELATED APPLICATIONS

This application claims priority to U.S. Ser. No. 62/803,765, filed Feb. 11, 2019, herein incorporated by reference.

FIELD OF INVENTION

Embodiments of the invention are directed toward biphasic polymerization processes, and in certain embodiments biphasic polymerization processes that produce ethylene-based polyolefins with narrow molecular weight distributions.

BACKGROUND OF INVENTION

Continuous solution polymerization processes generally involve the addition of catalyst to monomer and solvent mixture at conditions that keep the polymer product dissolved in the biphasic reaction medium. The mixture may be back-mixed to provide a uniform polymer in an environment with substantially no concentration gradients. WO 94/00500 (Pannell, et al.) describes a solution polymerization using metallocene in a continuous stirred tank reactor, which may be in a series reactor arrangement to make a variety of products.

The heat of the polymerization reaction can be absorbed by the polymerization mixture, causing an exotherm; i.e., a temperature rise of the reaction medium. Alternatively, or in addition, the heat of reaction can be removed by a cooling system, by external cooling of the walls of the reactor vessel, or by internally arranged heat exchange surfaces cooled by a heat exchange fluid.

In the course of a typical solution polymerization, monomer is consumed (e.g., over 50 mol %) and the polymer formed is dissolved in the solvent. Generally, the higher the concentration of the polymer, the higher the viscosity of the polymerization reaction mixture containing the polymer, solvent, and unreacted components, such as unreacted monomer and catalyst. The mixture passes from the polymerization reactor to a finishing section in which polymer, solvent and unreacted monomer are separated. In the course of finishing, solvent and unreacted monomer can be progressively removed from the polymerization mixture, and then the polymer can be formed into a solid pellet or bale. The separated solvent and monomer can be recycled to the polymerization reactor.

It is well known from extensive literature sources that polymer solutions can undergo phase separation at and above the lower critical separation temperature (LCST), to form two liquid phases (i.e. biphasic) with phase separation being encouraged by higher temperatures and/or by lower pressures. See, for example, *A Low-Energy Solvent Separation Method* by T. G. Gutowski et al, POLYMER ENGINEERING; *Solvents*, by C. A. Irani et al. in JOURNAL OF APPLIED POLYMER SCIENCE Vol 31, 1879-1899 (1986); *Separating Polymer Solutions with Supercritical Fluids*, by Mark A. McHugh et al. in MACROMOLECULES 1985, 18, 674-680; *Critical Dynamics and Phase Separation Kinetics, etc*. by Hajime Tanaka in JOURNAL OF CHEMICAL PHYSICS 100 (7) 1 Apr. 1994 p 5323-5337; *Short Chain Branching Effect on the Cloud Point Pressures of Ethylene Copolymers etc*., by S. J. Han et al. in MACROMOLECULES 1998, 31, 2533-2538.

The phenomenon of phase separation depends on the selection of the polymerization solvent. As a result, appropriate monomer conversions, especially of the volatile monomers, temperatures, and pressures, are selected for given polymer/solvent combination to avoid unwanted phase separation inside the reactor. Solvents such as hexane may require an elevated pressure in excess of 50 bar to avoid two-phase conditions for olefin polymerization; solvents such as octane can maintain homogeneous one-phase conditions at lower pressures.

The phenomenon of phase separation is often exploited after the reaction step to separate volatile solvent and unreacted monomer components on the one hand, and polymer on the other hand. Typically, separations at temperatures well above the lower critical separation temperature allow the polymer to form a concentrated phase.

In typical solution polymerization processes that take place commercially, solvent selection, operating temperature and pressure, and purification systems are designed for particular operating windows for the desired polymerization process. While most commercially important solution polymerization processes for producing ethylene-based polyolefins operate below the lower critical separation temperature and thus in a single liquid phase, U.S. Publication No. 2013/0281643 teaches a process for the synthesis of ethylene-based polyolefin where the reactor operates above a critical temperature at a given pressure thereby inducing poor solubility for the polymer in an appropriate solvent. This patent publication explains that above a critical temperature at a given pressure, poor solubility of the polymer results in a polymer-rich, high viscosity phase that is dispersed as droplets in a continuous low viscosity solvent phase. And, the resultant polymers are described as having a unique combination of high molecular weight and broad molecular weight distribution. Specifically, the polymers have a weight average molecular weight greater than, or equal to, 60,000 g/mol, and a molecular weight distribution (Mw/Mn) greater than, or equal to, 2.3.

SUMMARY OF INVENTION

Embodiments of the invention are directed toward a continuous process for preparing an ethylene-based polyolefin, the process comprising maintaining a polymerization mixture at a temperature at or above the lower critical phase separation temperature of the polymerization mixture, while, during said step of maintaining, maintaining the polymerization mixture at steady state, where the polymerization mixture is substantially uniform in temperature, pressure, and concentration, where the polymerization mixture includes solvent, monomer including ethylene and optionally monomer copolymerizable with ethylene, a single-site catalyst system, and polymer resulting from the polymerization of the monomer, where the monomer and the polymer are dissolved in the solvent, and where the polymer is an ethylene-based polyolefin having a molecular weight distribution (Mw/Mn) of less than 2.30.

Other embodiments of the invention are directed toward a method for preparing ethylene-based polyolefin, the method comprising (i) providing a polymerization vessel; (ii) continuously charging the polymerization vessel with monomer including ethylene and olefin monomer copolymerizable with ethylene, a solvent, and a single-site catalyst system, to thereby form a polymerization mixture; (iii) maintaining the polymerization mixture within the vessel at a temperature at or above the lower critical phase separation temperature of the polymerization mixture; (iv) mixing the polymerization within the vessel so that the temperature, pressure, and concentration of the polymerization mixture within the vessel is substantially uniform; and (v) continuously removing monomer, polymer formed by the polymerization of monomer, solvent, and single-site site catalyst system from the polymerization vessel at a rate substantially constant to the rate of continuously charging monomer, a solvent, and a single-site catalyst system, to thereby form a polymerization mixture, where the polymer continuously removed from the polymerization mixture is ethylene-based polyolefin having a molecular weight distribution of less than 2.30.

Still other embodiments of the invention are directed toward a polymeric solution comprising ethylene-based polyolefin dissolved in solvent at a temperature and pressure above the lower critical separation temperature of the polymer solution, where the ethylene-based polyolefin has a molecular weight distribution, Mw/Mn, of less than 2.3, where the solution is a biphasic solution including a first liquid phase including greater than 10 wt % ethylene-based polyolefin, based on the total weight of the first liquid phase, and a second liquid phase including less than 10,000 ppm ethylene-based polyolefin, based on the total weight of the second liquid phase.

DETAILED DESCRIPTION OF THE PRESENT INVENTION

Introduction

Embodiments of the invention are based, at least in part, on the discovery of a continuous process for solution polymerizing ethylene, optionally together with comonomer, at a pressure and temperature above the lower critical separation temperature (LCST) to thereby produce an ethylene-based polyolefin having a molecular weight distribution, Mw/Mn, of less than 2.3. In one or more embodiments, this continuous solution polymerization process employs a single-site catalyst that is soluble within the polymerization mixture, and the polymerization mixture is uniform and maintained at steady state. While the prior art contemplates the polymerization of ethylene using a single-site catalyst at temperatures and pressures above the LCST, the ethylene-based polyolefins produced by the prior art have a molecular weight distribution, Mw/Mn, that is greater than, or equal to, 2.3. Aspects of the present invention advantageously provide polymer with narrower molecular weight distribution, which has unexpectedly been achieved by the appropriate selection of process parameters. Embodiments of the invention are therefore directed toward these polymerization processes, as well as the biphasic, liquid-liquid, polymerization mixtures that are utilized by and produced by these processes.

Process—General

According to embodiments of the present invention, monomer, single-site catalyst, and solvent are continuously combined within a reactor to form a polymerization mixture, which may be referred to as a reaction medium that upon polymerization of monomer also includes ethylene-based polyolefin. The polymerization mixture is maintained at a temperature and pressure above the LCST as a uniform polymerization system operated at steady state while a portion of the polymerization mixture is continuously removed from the reactor.

Monomer

In one or more embodiments, monomer includes ethylene and optionally additional monomer(s) polymerizable with ethylene, the latter of which may be referred to as comonomer. Examples of monomers copolymerizable with ethylene include, but are not limited to, propylene, alpha-olefins (which include $C_4$ or higher 1-alkenes), vinyl aromatics, vinyl cyclic hydrocarbons, and dienes such as cyclic dienes and alpha-omega dienes.

In particular embodiments, the alpha-olefin includes a $C_4$ to $C_{12}$ alpha-olefin. In one or more embodiments, the alpha-olefin monomer other than ethylene includes, but is not limited to, 1-butene, 1-hexene, 1-octene, 1-decene, 1-dodecene, 4-methyl-1-pentene, and 3-methyl-1-pentene.

Examples of vinyl cyclic hydrocarbons include vinyl cycloalkanes, such as vinyl cyclohexane and vinyl cyclopentane. Exemplary vinyl aromatics include styrene and substituted styrene such as alphamethylstyrene.

Exemplary cyclic dienes include vinylnorbornene, norbornadiene, ethylidene norbornene, divinylbenzene, cyclopentadiene, dicyclopentadiene or higher ring containing diolefins with or without substituents at various ring positions.

Examples of alpha-omega dienes include butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, 1,18-nonadecadiene, 1,19-icosadiene, 1,20-heneicosadiene, 1,21-docosadiene, 1,22-tricosadiene, 1,23-tetracosadiene, 1,24-pentacosadiene, 1,25-hexacosadiene, 1,26-heptacosadiene, 1,27-octacosadiene, 1,28-nonacosadiene, 1,29-triacontadiene, and low molecular weight polybutadienes (weight average molecular weight Mw, less than 1000 g/mol).

In one or more embodiments, the ethylene concentration within the reactor (which exists in the polymerization mixture and the reactor headspace) relative to the total monomer content (i.e., ethylene plus all comonomer) is greater than 45 wt %, in other embodiments greater than 50 wt %, in other embodiments greater than 55 wt %, in other embodiments greater than 60 wt %, in other embodiments greater than 65 wt %, in other embodiments greater than 70 wt %, in other embodiments greater than 75 wt %, in other embodiments greater than 80 wt %, in other embodiments greater than 85 wt %, in other embodiments greater than 90 wt %, and in other embodiments greater than 95 wt % of the total weight of monomer. In one or more embodiments, considering that the molecular weight of ethylene is lower than the molecular weight of comonomer, the concentration of ethylene will be greater than 50 mol %.

In particular embodiments, one or more dienes are present in the polymerization mixture. For example, the polymerization mixture may include at up to 10 wt %, or 0.00001 to 1.0 wt %, or 0.002 to 0.5 wt %, or 0.003 to 0.2 wt %, based upon the total weight of the monomer. In some embodiments 500 ppm or less of diene is added to the polymerization mixture, or 400 ppm or less, preferably, or 300 ppm or less. In other embodiments, at least 50 ppm of diene is added to the polymerization mixture, or 100 ppm or more, or 150 ppm or more. In particular embodiments, the polymerization mixture is devoid of diene monomer.

Solvent

In one or more embodiments, useful solvents include non-coordinating, inert liquids that dissolve the single-site catalyst, the monomer, and the resulting polymer. In other words, useful solvents provide a solution polymerization system wherein the single-site catalyst, monomer, and polymer are molecularly dispersed.

Examples of useful solvents include straight and branched-chain paraffinic hydrocarbons, such as butane, isobutane, pentane, isopentane, hexanes, isohexane, heptane, isoheptane, octane, isooctane, dodecane, and mixtures thereof; cyclic and alicyclic hydrocarbons, such as cyclopentane, cyclohexane, cycloheptane, methylcyclopentane, methylcyclohexane, methylcycloheptane, and mixtures thereof, such as can be found commercially (Isopar™); perhalogenated hydrocarbons, such as perfluorided $C_{4-10}$ alkanes, chlorobenzene, and aromatic and alkylsubstituted aromatic compounds, such as benzene, toluene, mesitylene, and xylene. In another embodiment, the solvent is non-aromatic. In particular embodiments, aromatics are present in the solvent at less than 1 wt %, or less than 0.5 wt %, or less than 0.1 wt % based upon the weight of the solvents. In other embodiments, the solvent is essentially free of benzene.

Single-Site Catalyst

For purposes of this specification, a single-site catalyst (SSC) refers to an active catalyst system that includes a transition metal center (e.g., a metal of group 3 to 10 of the Periodic Table) and at least one ligand that can be abstracted and thereby allow for insertion of the ethylene or comonomer. The active catalyst system (i.e., active single-site catalyst system) is formed by combining a transition metal precursor compound (such as a metallocene compound) with an activator compound. Single-site catalysts are well known in the art as described in METALLOCENE-BASED POLYOLEFINS, J. Scheirs and W Kaminsky, Eds., Wiley, New York, 2000; and STEREOSELECTIVE POLYMERIZATION WITH SINGLE-SITE CATALYSTS, L. S. Baugh and J. A. M. Canich, Eds., CRC, New York, 2008.

In one or more embodiments, the active catalyst may be present as an ion pair of a cation and an anion, where the cation derives from the transition metal precursor compound (e.g., metallocene compound) and the anion derives from the activator compound (e.g., the transition metal is in its cationic state and is stabilized by the activator compound or an anionic species thereof). In particular embodiments, the ligand remains bonded to the transition metal during polymerization. In these or other embodiments, the mono-anionic ligands are displaceable by a suitable activator to permit insertion of a polymerizable monomer at the vacant coordination site of the transition metal component.

In one or more embodiments, a single, single-site catalyst is included with the polymerization. In other words, within these embodiments, a single transition metal precursor species is combined with a single activator species.

Transition Metal Precursor Compound

As suggested above, the precursor compound can include a metallocene compound, or it may include a non-metallocene transition metal compound.

In one or more embodiments, the transition metal precursor compound is a metallocene compound. Metallocene compounds include compounds with a central transition metal and at least two ligands selected from cyclopentadienyl ligands and ligands that are isolobal to cyclopentadienyl ligands. Exemplary transition metals include Group 4 (also known as Group IV) of the Periodic table, such as titanium, hafnium or zirconium. Exemplary cyclopentadienyl ligands, or ligands isolobal thereto, include, but are not limited to, cyclopentadienyl ligands, cyclopentaphenanthrenyl ligands, indenyl ligands, benzindenyl ligands, fluorenyl ligands, octahydrofluorenyl ligands, cyclooctatetraenyl ligands, cyclopentacyclododecene ligands, azenyl ligands, azulene ligands, pentalene ligands, phosphoyl ligands, phosphinimine ligands (WO 99/40125), pyrrolyl ligands, pyrazolyl ligands, carbazolyl ligands, borabenzene ligands and the like, including hydrogenated versions thereof, for example tetrahydroindenyl ligands. These ligands may include one or more heteroatoms, for example, nitrogen, silicon, boron, germanium, sulfur and phosphorus, in combination with carbon atoms to form an open, acyclic, or a fused, ring or ring system, for example, a heterocyclopentadienyl ancillary ligand. Other ligands include but are not limited to porphyrins, phthalocyanines, corrins and other polyazamacrocycles. The metallocene compounds may be bridged or unbridged, or they may be substituted or unsubstituted. For purposes of this specification, the term "substituted" means that a hydrogen group has been replaced with a hydrocarbyl group, a heteroatom, or a heteroatom containing group. For example, methyl cyclopentadiene is a ligand group substituted with a methyl group.

In one or more embodiments, useful metallocene compounds may be defined by the formula: $L^A L^B L^C_i MDE$ where, $L^A$ is a substituted cyclopentadienyl or heterocyclopentadienyl ligand π-bonded to M; $L^B$ is a member of the class of ligands defined for $L^A$, or is J, a hetero-atom ligand Σ-bonded to M; the $L^A$ and $L^B$ ligands may be covalently bridged together through a Group 14 element linking group; $L^C_i$ is an optional neutral, non-oxidizing ligand ($_i$ equals 0 to 3); M is a Group 4 or 5 transition metal; and, D and E are independently mono-anionic labile ligands, each having a Σ-bond to M, optionally bridged to each other or $L^A$ or $L^B$.

Other examples include metallocenes that are biscyclopentadienyl derivatives of a Group IV transition metal, such as zirconium or hafnium. See e.g. WO9941294. These may advantageously be derivatives containing a fluorenyl ligand and a cyclopentadienyl ligand connected by a single carbon and silicon atom. See e.g. WO9945040 and WO9945041. In particular embodiments, the cyclopentadienyl ligand (Cp) is unsubstituted and/or the bridge contains alkyl substituents, in certain embodiments alkylsilyl substituents, to assist in the alkane solubility of the metallocene. See WO0024792 and WO0024793. Other possible metallocenes include those in WO01/58912.

Still other metallocene compounds are disclosed in EP418044, including monocyclopentadienyl compounds similar that that EP416815. Similar compounds are also described in EP420436. Yet others are disclosed in WO9703992, which discloses a catalyst in which a single Cp species and a phenol are linked by a C or Si linkage, such as Me2C(Cp)(3-tBu-5-Me-2-phenoxy)TiCl2. And, WO200105849 discloses Cp-phosphinimine catalysts, such as (Cp)((tBu)3P=N—)TiCl2.

Other suitable metallocenes may be bisfluorenyl derivatives or unbridged indenyl derivatives, which may be substituted at one or more positions on the fused ring with moieties that have the effect of increasing the molecular weight and so indirectly permit polymerization at higher temperatures such as described in EP693506 and EP780395.

In other embodiments, the transition metal precursor is a non-metallocene transition metal compound. Representative non-metallocene transition metal compounds useful for forming a single-site catalyst include tetrabenzyl zirconium, tetra bis(trimethylsiylmethyl) zirconium, oxotris(trimethlsilylmethyl) vanadium, tetrabenzyl hafnium, tetrabenzyl titanium, bis(hexamethyl disilazido)dimethyl titanium, tris(trimethyl silyl methyl) niobium dichloride, and tris (trimethylsilylmethyl) tantalum dichloride.

Activator Compounds

In one or more embodiments, the activator compound, which may be referred to simply as an activator, may be an alumoxane, such as methylalumoxane. The alumoxanes may have an average degree of oligomerization of from 4 to 30, as determined by vapor pressure osmometry. The alumoxane may be modified to provide solubility in linear alkanes or be used in a slurry (e.g. may include a toluene solution). These solutions may include unreacted trialkyl aluminum, and the alumoxane concentration is generally indicated as mol Al per liter, which figure includes any trialkyl aluminum that has not reacted to form an oligomer. The alumoxane, when used as an activator compound, is generally used in molar excess, at a mol ratio of 50 or more, or 100 or more, or 1000 or less, or 500 or less, relative to the transition metal precursor compound.

Non-Coordinating Anion

In one or more embodiments, the activator compound is a compound (i.e. activator precursor) that gives rise to a non-coordinating anion, which is a ligand that weakly coordinates with the metal cation center of the transition metal compound. For purposes of this specification, the term non-coordinating anion includes weakly coordinating anions. As the skilled person will appreciate, the coordination of the non-coordinating anion should be sufficiently weak to permit the insertion of the unsaturated monomer component. In one or more embodiments, the activator precursor for the non-coordinating anion may be used with a metallocene supplied in a reduced valency state. In one or more embodiments, the activator precursor may undergo a redox reaction. In one or more embodiments, the precursor may be an ion pair of which the precursor cation is neutralized and/or eliminated in some manner. For example, the precursor cation may be an ammonium salt as in EP-277003 and EP-277004. In other examples, the precursor cation may be a triphenylcarbonium derivative.

In one or more embodiments, the activator precursor may include borates or metal alkyls. In one or more embodiments, the non-coordinating anion can be a halogenated, tetra-aryl-substituted Group 10-14 non-carbon element-based anion, especially those that are have fluorine groups substituted for hydrogen atoms on the aryl groups, or on alkyl substituents on those aryl groups. For example, effective Group 10-14 element activator complexes may be derived from an ionic salt including a 4-coordinate Group 10-14 element anionic complex. In one or more embodiments, the anion can be represented as: $[(M)Q_1Q_2 \ldots Q_i]^-$, where M is one or more Group 10-14 metalloid or metal, (e.g. boron or aluminum), and each Q is a ligand effective for providing electronic or steric effects rendering $[(M')Q_1Q_2 \ldots Q_n]^-$ suitable as a non-coordinating anion as that is understood in the art, or a sufficient number of Q are such that $[(M')Q_1Q_2 \ldots Q_n]^-$ as a whole is an effective non-coordinating or weakly coordinating anion. Exemplary Q substituents specifically include fluorinated aryl groups, (e.g., perfluorinated aryl groups), and include substituted Q groups having substituents additional to the fluorine substitution, such as fluorinated hydrocarbyl groups. Exemplary fluorinated aryl groups include phenyl, biphenyl, naphthyl and derivatives thereof.

In one or more embodiments, the non-coordinating anion may be used in approximately equimolar amounts relative to the transition metal component, such as at least 0.25, or at least 0.5, or at least 0.8, or at least 1.0, or at least 1.05. In these or other embodiments, non-coordinating anion may be used in approximately equimolar amounts relative to the transition metal component and such as no more than 4, preferably 2 and especially 1.5.

Scavengers

In one or more embodiments, the polymerization mixture may additionally include a scavenger compound, which may include an organometallic compound. These compounds are effective for removing polar impurities from the reaction environment and/or for increasing catalyst activity. As the skilled person appreciates, impurities can be inadvertently introduced to the polymerization reaction components (e.g., with any of the polymerization reaction components, solvent, monomer and catalyst), which can adversely affect catalyst activity and stability. By way of example, these impurities can include, without limitation, water, oxygen, heteroatom-containing polar organic compounds, metal impurities, etc.

Exemplary scavengers include organometallic compounds such as the Group 13 organometallic compounds. Specific examples include triethyl aluminum, triethyl borane, tri-isobutyl aluminum, tri-n-octyl aluminum, methylalumoxane, and isobutyl alumoxane. Alumoxane also may be used in scavenging amounts with other means of activation, e.g., methylalumoxane and tri-isobutyl-aluminoxane with boron-based activators. In one or more embodiments, the amount of scavenger used with catalyst compounds of the inventions is minimized during polymerization reactions to that amount effective to enhance activity (and with that amount necessary for activation of the catalyst compounds if used in a dual role) since excess amounts may act as catalyst poisons. Useful scavengers are disclosed in U.S. Pat. Nos. 5,153,157 and 5,241,025, as well as International Publications WO 91/09882, WO 94/03506, WO 93/14132, and WO 95/07941.

Formation of Active Catalyst

In one or more embodiments, the single-site catalyst may be formed by combining the precursor compound with the activator compound, optionally together with a scavenger, prior to introducing the single-site catalyst to the monomer to be polymerized. In this regard, reference may be made to a pre-formed single-site catalyst system. In other embodiments, the single-site catalyst may be formed in situ within the reactor in which the polymerization of monomer takes place. For example, the precursor compound and the activator compound may be introduced to the reactor separately and individually (e.g., via separate feed streams).

Ethylene-Based Polyolefins

As indicated above, polymerization of monomer with the single-site catalyst leads to the formation of ethylene-based polyolefin, which is included in the polymerization mixture. For purposes of this specification, ethylene-based polyolefins include polyethylene homopolymer, polyethylene copolymers, and mixtures thereof. Polyethylene copolymers are copolymers including ethylene-derived units and comonomer-derived units. In other words, the polyethylene copolymers are prepared from the polymerization of ethylene and one or more comonomer(s), which comonomer(s) are described herein above.

According to embodiments of the present invention, the ethylene-based polyolefins may be characterized by the amount of comonomer-derived units, other than ethylene-derived units, within the composition. As the skilled person will appreciate, the amount of comonomer-derived units (i.e., non-ethylene units) can be determined by nuclear magnetic resonance analysis, which may be referred to as NMR analysis.

In one or more embodiments, the ethylene-based polyolefin may include greater than 0.5, in other embodiments greater than 1, and in other embodiments greater than 3 mol % comonomer-derived units other than ethylene-derived units, with the balance including ethylene-derived units. In these or other embodiments, the ethylene-based polyolefins may include less than 20, in other embodiments less than 15, in other embodiments less than 10, and in other embodiments less than 7 mol % comonomer-derived units other than ethylene-derived units, with the balance including ethylene-derived units. In one or more embodiments, the polyethylene composition of the present invention may include from about 0.5 to 20 mol %, in other embodiments from 1 to 15 mol %, and in other embodiments from 3 to 10 mol % comonomer-derived units other than ethylene-derived units, with the balance including ethylene-derived units.

The ethylene-based polyolefins of the present invention may be characterized by their number average molecular weight (Mn), which may be measured by using the technique set forth below. According to embodiments of the present invention, the ethylene-based polyolefins may have a Mn of greater than 10,000, in other embodiments greater than 12,000, in other embodiments greater than 15,000, and in other embodiments greater than 20,000 g/mol. In these or other embodiments, the ethylene-based polyolefins may have a Mn of less than 200,000, in other embodiments less than 100,000, in other embodiments less than 80,000, and in other embodiments less than 60,000 g/mol. In one or more embodiments, the ethylene-based polyolefins have a Mn of from about 10,000 to about 200,000, in other embodiments from about 12,000 to about 100,000, in other embodiments from about 15,000 to about 80,000, and in other embodiments from about 20,000 to about 60,000 g/mol.

The ethylene-based polyolefins of the present invention may be characterized by their number average molecular weight (Mw), which may be measured by using the technique set forth below. According to embodiments of the present invention, the ethylene-based polyolefins may have a Mw of greater than 40,000, in other embodiments greater than 80,000, in other embodiments greater than 90,000, and in other embodiments greater than 100,000 g/mol. In these or other embodiments, the ethylene-based polyolefins may have a Mw of less than 500,000, in other embodiments less than 400,000, in other embodiments less than 300,000, in other embodiments less than 250,000, in other embodiments less than 200,000, and in other embodiments less than 180,000 g/mol. In one or more embodiments, the ethylene-based polyolefins have a Mw of from about 40,000 to about 500,000, in other embodiments from about 80,000 to about 500,000, in other embodiments from about 80,000 to about 400,000, in other embodiments from about 90,000 to about 200,000, and in other embodiments from about 100,000 to about 180,000 g/mol.

The ethylene-based polyolefins of the present invention may be characterized by their molecular weight distribution (Mw/Mn), which may also be referred to as polydispersity, where Mw and Mn may be measured by using the technique set forth below. According to embodiments of the present invention, the ethylene-based polyolefins have a Mw/Mn of less than 2.30, in other embodiments less than 2.25, in other embodiments less than 2.20, in other embodiments less than 2.10, and in other embodiments essentially equal to 2.00. In one or more embodiments, the ethylene-based polyolefins have an Mw/Mn of from about 2.00 to about 2.28, in other embodiments from about 2.05 to about 2.25, and in other embodiments from about 2.10 to about 2.23.

GPC 3D Methodology

Mw, Mn and Mw/Mn may be determined by using a High Temperature Gel Permeation Chromatography (Agilent PL-220), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, pp. 6812-6820, (2001) and references therein. Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/ml at room temperature and 1.284 g/ml at 145° C. The injection concentration is from 0.5 to 2.0 mg/ml, with lower concentrations being used for higher molecular weight samples. Prior to running each sample, the DRI detector and the viscometer are purged. Flow rate in the apparatus is then increased to 0.5 ml/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c = K_{DRI} I_{DRI} / (dn/dc),$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in $g/cm^3$, molecular weight is expressed in g/mole, and intrinsic viscosity is expressed in dL/g.

The LS detector is a Wyatt Technology High Temperature DAWN HELEOS. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c.$$

Here, $\Delta R(\theta)$ is the measured excess Rayleigh scattering intensity at scattering angle θ, c is the polymer concentration determined from the DRI analysis, $A_2$ is the second virial coefficient. $P(\theta)$ is the form factor for a monodisperse random coil, and $K_o$ is the optical constant for the system:

$$K_o = \frac{4\pi^2 n^2 (dn/dc)^2}{\lambda^4 N_A},$$

where $N_A$ is Avogadro's number, and (dn/dc) is the refractive index increment for the system, which take the same value as the one obtained from DRI method. The refractive index, n=1.500 for TCB at 145° C. and λ=657 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_S$, for the solution flowing through the viscometer is calculated from their outputs. The intrinsic viscosity, $[\eta]$, at each point in the chromatogram is calculated from the following equation:

$$\eta_S = c[\eta] + 0.3(c[\eta])^2,$$

where c is concentration and was determined from the DRI output.

Reactors

In one or more embodiments, the polymerization mixtures may be formed within and the polymerization reaction conducted within a suitable reactor. In one or more embodiments, suitable reactors include continuous stirred tank reactors (CSTRs), continuous loop reactors with sufficient circulation rate, and boiling pool reactors. The process of the invention may employ one or more reactors. When more than one reactor is deployed in the process, they may be of the same or different reactor type, but at least one of the more than one reactors will be suitable for the process of the present invention; i.e., at least one of the reactors can accommodate a polymerization mixture maintained above the lower critical separation temperature and provide a homogeneous polymerization mixture maintained at steady state.

The reactors may be fully liquid filled or may be partially filled with liquid, the second phase being a gas filled with the vapors in equilibrium with the liquid phase. When more than one reactor is used, the reactors may operate at the same or different conditions with the same or different feeds. When more than one reactor is deployed in the process of the current disclosure, they may be of the same or different reactor type, but at least one of the more than one reactors will be suitable for the process of the current disclosure and will produce a polymer with narrow molecular weight distribution, and in case of copolymers narrow composition distribution, in a liquid-liquid phase separated solution medium. They may be connected in series or in parallel, or any other combination when more than two reactors are employed.

Reactor Polymerization Conditions
Lower Critical Separation Temperature (LCST)

According to embodiments of the present invention, the polymerization mixture is maintained at a temperature and pressure above the lower critical separation temperature (LCST). As a result, the polymerization mixture is a liquid-liquid, biphasic reaction medium. While the LCST of any given polymerization mixture can depend on several factors, such as the solvent used and the concentration of the monomer and polymer within the system, those having skill in the art can readily determine, without undue experimentation or calculation, the LCST of any given polymerization mixture at a specified pressure.

In one or more embodiments, the processes of the present invention include maintaining the polymerization mixture under a pressure of less than 70 atm, in other embodiments less than 60 atm, in other embodiments less than 50 atm, in other embodiments less than 45 atm, and in other embodiments less than 40 atm. In one or more embodiments, the processes of the present invention includes maintaining the polymerization mixture under a pressure of from about 40 to about 70 atm, in other embodiments from about 50 to about 68 atm, and in other embodiments from about 60 to about 65 atm.

In combination with the above-described pressures at which the polymerization mixture is maintained, the processes of the present invention includes maintaining the polymerization mixture at a temperature that is greater than 130° C., in other embodiments greater than 140° C., in other embodiments greater than 145° C., in other embodiments greater than 150° C., in other embodiments greater than 155° C., in other embodiments greater than 160° C., in other embodiments greater than 165° C., and in other embodiments greater than 170° C. In one or more embodiments, the polymerization mixture is maintained, in combination with the above-described pressures, in the temperature range of from about 130 to about 170° C., in other embodiments from about 150 to about 168° C., and in other embodiments from about 155 to about 165° C.

Steady State

According to aspects of the invention, the polymerization mixture is maintained under steady state conditions of temperature and pressure during polymerization of the monomer. Under steady-state conditions, all feed rates and feed and effluent compositions, are substantially constant. For purposes of this specification, steady state refers to maintaining substantially constant reactor feed and effluent compositions, temperature and pressure within a specified time domain (i.e. over a given period of time). In one or more embodiments, the time domain is the time duration in which the monomer undergoes polymerization. In these or other embodiments, the time domain is the residence time that the polymerization mixture is in the polymerization reactor. In these or other embodiments, this time duration refers to the time at which the polymerization mixture is above the LCST.

Relative to the meaning of steady state conditions, substantially constant temperature and pressure refers to maintaining the polymerization mixture within those temperature and pressure fluctuations that yield less than appreciable changes in the polymerization of monomer, especially with regard to the molecular weight distribution of the resulting polymer. In one or more embodiments, the temperature and pressure of polymerization mixture is maintained, with respect to the relevant time domain, at temperatures and pressures that have a relative percent difference of less than 10%, in other embodiments less than 8%, in other embodiments less than 6%, and in other embodiments less than 4%. Relative percent difference is calculated by obtaining two measurements (e.g. two temperature measurements) at two different times during the relative time domain (e.g. during the residence time of the polymerization), calculating the absolute difference, if any, between the measurements, dividing the difference by the average of the two measurements, and then multiplying by 100%. As an example, this calculation can be described for reactor temperature by the following formula $$|\Delta T|/(\Sigma T/2) \times 100\%$$

where $\Delta T$ is T high−T low, and $\Sigma T$ = T high+T low. T high and T low are, respectively, the highest and lowest temperatures measured at a given point in the reactor (e.g. in the bulk or at the exit port) during the relevant time domain.

In one or more embodiments, the polymerization mixture is maintained, over the relevant time domain (e.g. during the residence time within the polymerization reactor) so as to maintain temperature fluctuations of less than 15° C., in other embodiments less than 10° C., and in other embodiments less than 5° C. In these or other embodiments, the polymerization mixture is maintained, over the relevant time domain (e.g. during the residence time within the polymerization reactor), so as to maintain pressure fluctuations of less than 10 atm, in other embodiments less than 7 atm, and in other embodiments less than 4 atm.

The skilled person will be able to readily maintain the temperature and pressure of the polymerization mixture, during the relevant time domain, within the parameters of this invention without the exercise of undue calculation or experimentation. For example, conventional means exist to manipulate and maintain the pressure of a polymerization reactor such as a continuously-stirred tank reactor (CSTR). Likewise, the temperature can be controlled by employing conventional techniques such as, but not limited to, cooling jackets by adjusting the catalyst feed rate to the reactor, which adjusts the catalyst concentration in the reactor.

Mixing

During the polymerization process, the polymerization mixture is mixed or otherwise agitated to achieve at least two polymerization mixture characteristics. First, the polymerization mixture is sufficiently mixed to achieve a polymerization mixture that has one or more uniform properties. Second, the polymerization mixture is sufficiently mixed and/or agitated to achieve a fine dispersion of the first liquid domain within the second liquid domain of the liquid-liquid biphasic medium.

For purposes of this specification, the polymerization mixture is sufficiently mixed to achieve uniformity with respect to temperature. This includes the absence of a significant temperature gradient within the polymerization mixture in the reactor (i.e. relative to the spatial domain)

In one or more embodiments, the polymerization mixture is sufficiently agitated to achieve a relative percent difference for temperature, between any two locations within the polymerization mixture in the reactor, of less than 15%, in other embodiments less than 10%, and in other embodiments less than 5%. Relative percent difference is calculated by obtaining two measurements (e.g., temperature) at two different locations within the relevant spatial domain (i.e., within the reactor), determining the absolute difference, if any, between the measurements, dividing the difference by the average of the two measurements, and multiplying by 100 percent. Reference can be made to the above formula for calculating relative percent difference.

In one or more embodiments, the polymerization mixture is sufficiently mixed or otherwise maintained to achieve a relative percent difference in pressure, between any two locations within the polymerization mixture, of less than 10%, in other embodiments less than 6%, and in other embodiments less than 3%.

In one or more embodiments, the polymerization mixture is sufficiently mixed to achieve a relative percent difference in the concentration of dissolved or solubilized solids (e.g. catalyst, monomer, and polymer), between any two locations within the polymerization mixture, of less than 10%, in other embodiments less than 5%, and in other embodiments less than 3%.

As suggested above, mixing is also sufficient to provide a fine dispersion of the first liquid domain within the second liquid domain. In one or more embodiments, the first liquid domain, which is dispersed in the second liquid domain, has a size, which is the diameter or longest dimension of the domain, that is less than 1,000 µm, in other embodiments less than 100 µm, and in other embodiments less than 10 µm.

In one or more embodiments, the requisite mixing or agitation for practice of the present invention can be achieved by employing conventional mixing techniques. Indeed, those skilled in the art appreciate how to achieve well-mixed reactors. For example, mixing can be accomplished by employing mechanical agitators, by circulation through a loop reactor, or by the churn created by a boiling reaction medium.

Compositional Characteristics of Biphasic System

The respective liquid phases of the liquid-liquid biphasic system may have unique compositional characteristics. In one or more embodiments, one phase may have a higher concentration of ethylene-based polyolefin relative to the second phase. In this regard, reference may be made to polymer-rich phase and polymer-lean phase, respectively. In one or more embodiments, the polymer-lean phase includes less than 10,000 ppm by weight, in other embodiments less than 5,000 ppm by weight, in other embodiments less than 1,000 ppm by weight, and in other embodiments less than 500 ppm by weight polymer (i.e., ethylene-based polyolefin). In these or other embodiments, the polymer-rich phase may include greater than 10, in other embodiments greater than 15, in other embodiments greater than 20, in other embodiments greater than 25, in other embodiments greater than 30, in other embodiments greater than 35, in other embodiments greater than 40% by weight polymer (i.e., ethylene-based polyolefin).

In one or more embodiments, the polymer rich phase is the dispersed phase and the polymer-lean phase is the continuous phase of the liquid-liquid biphasic system.

In one or more embodiments, the polymer-rich phase and the polymer-lean phase generally have similar concentrations of monomer. In one or more embodiments, the respective monomer concentrations of the polymer-rich phase and the polymer-lean phase vary by less than 10 wt %, in other embodiments by less than 5 wt %, and in other embodiments by less than 1 wt %.

Post-Polymerization Separation and Finishing

After the polymerization as described herein, the polymerization mixture is removed from the vessel in which the polymerization was conducted, and then the resultant ethylene-based polyolefin can be separated from the polymerization mixture (i.e. it is separated from the solvent and unreacted monomer). In one or more embodiments, once removed from the vessel in which the polymerization took place, the two or more polymerization mixtures (which include solutions of polymer) may be blended (i.e. solution blended off line). This may be particularly useful where multiple polymerization processes are conducted in series or in parallel. As the skilled person will appreciate, these polymer blends may be made for the purpose of improving polymer melt processability or for improving polymer performance for a particular use. For example, ethylene-based bimodal orthogonal composition distributions (BOCD) products, in which the high MW component contains higher concentration of comonomers than the low MW component, are known to have improved crack resistance in injection molded products. These BOCD products can be made by blending a high MW component made in one reactor with a low MW component from another reactor. Similarly, melt processability of the polymers of the current disclosure can be improved by broadening the MWD by blending two components of different MW and/or by blending in at least one polymer component that has long-chain branching. Depending how close the molecular weights of the blend components are, the blends may or may not show bimodal (in case of two different blend components) or multimodal (in case of more than two different blend components) molecular weight and/or compositional distribution. When the components have similar MW and/or composition, the envelopes of their analytical traces may overlap so much that they appear to have a single component, though with broadened distribution. Nonetheless, they are bi- or multimodal in their essence even if the analytical techniques cannot clearly show it.

In any event, the polymerization mixture can be subjected to any conventional process for the separation of the polymer product from the solvent and monomer. For example, devolatization processes may include the use of devolatizing extruders, which typically heat and mechanically manipulate the polymerization mixture to separate the solvent and monomer as a volatiles stream. In one or more embodiments, this stream can be further treated or otherwise directly recycled back to the polymerization reactor.

End Uses

The ethylene-based polyolefins of the present invention can be fabricated into various articles for a variety of uses. For example, the ethylene-based polyolefins can be injection molded or cast into films.

Specific Embodiments

Paragraph A: A continuous process for preparing an ethylene-based polyolefin, the process comprising maintaining a polymerization mixture at a temperature at or above the lower critical phase separation temperature of the polymerization mixture, while, during said step of maintaining, maintaining the polymerization mixture at steady state, where the polymerization mixture is substantially uniform in temperature, pressure, and concentration, where the polymerization mixture includes solvent, monomer including ethylene and optionally monomer copolymerizable with ethylene, a single-site catalyst system, and polymer resulting from the polymerization of the monomer, where the monomer and the polymer are dissolved in the solvent, and where the polymer is an ethylene-based polyolefin having a molecular weight distribution (Mw/Mn) of less than 2.30.

Paragraph B: The process of Paragraph A, where said step of maintaining a polymerization mixture includes maintaining the polymerization mixture at a pressure of less than 70 atm.

Paragraph C: The process of one or more of Paragraphs A and B, where said step of maintaining a polymerization mixture includes maintaining the polymerization mixture at a pressure of less than 50 atm.

Paragraph D: The process of one or more of Paragraphs A-C, where said step of maintaining a polymerization mixture includes maintaining the polymerization mixture at a temperature greater than 130° C.

Paragraph E: The process of one or more of Paragraphs A-D, where said step of maintaining a polymerization mixture includes maintaining the polymerization mixture at a temperature greater than 150° C.

Paragraph F: The process of one or more of Paragraphs A-E, where, during said step of maintaining, maintaining the polymerization mixture at temperature fluctuations of less than 15° C.

Paragraph G: The process of one or more of Paragraphs A-F, where, during said step of maintaining, maintaining the polymerization mixture at temperature fluctuations of less than 10° C.

Paragraph H: The process of one or more of Paragraphs A-G, where, during said step of maintaining, maintaining the polymerization mixture at pressure fluctuations of less than 10 atm.

Paragraph I: The process of one or more of Paragraphs A-H, where, during said step of maintaining, maintaining the polymerization mixture at pressure fluctuations of less than 7 atm.

Paragraph J: The process of one or more of Paragraphs A-I, where, during said step of maintaining, maintaining the temperature and pressure of the polymerization mixture at a relative percent difference of less than 10%.

Paragraph K: The process of one or more of Paragraphs A-J, where, during said step of maintaining, maintaining the temperature and pressure of the polymerization mixture at a relative percent difference of less than 6%.

Paragraph L: The process of one or more of Paragraphs A-K, where the ethylene-based polyolefin has a molecular weight distribution (Mw/Mn) of less than 2.25.

Paragraph M: The process of one or more of Paragraphs A-L, where the ethylene-based polyolefin has a molecular weight distribution (Mw/Mn) of less than 2.20.

Paragraph N: The process of one or more of Paragraphs A-M, where the single-site catalyst is prepared by combining a metallocene compound and an activator compound.

Paragraph O: The process of one or more of Paragraphs A-N, where the polymerization mixture is biphasic liquid-liquid system including a first liquid phase dispersed within a second liquid phase.

Paragraph P: The process of one or more of Paragraphs A-O, where the first liquid phase is in the form of liquid domains having a diameter of less than 1,000 µm.

Paragraph Q: The process of one or more of Paragraphs A-P, where the first liquid phase is in the form of liquid domains having a diameter of less than 100 µm.

Paragraph R: A method for preparing ethylene-based polyolefin, the method comprising (i) providing a polymerization vessel; (ii) continuously charging the polymerization vessel with monomer including ethylene and olefin monomer copolymerizable with ethylene, a solvent, and a single-site catalyst system, to thereby form a polymerization mixture; (iii) maintaining the polymerization mixture within the vessel at a temperature at or above the lower critical phase separation temperature of the polymerization mixture; (iv) mixing the polymerization mixture within the vessel so that the temperature, pressure, and concentration of the polymerization mixture within the vessel is substantially uniform; and (v) continuously removing monomer, polymer formed by the polymerization of monomer, solvent, and single-site site catalyst system from the polymerization vessel at a rate substantially constant to the rate of continuously charging monomer, a solvent, and a single-site catalyst system, where the polymer continuously removed from the polymerization mixture is ethylene-based polyolefin having a molecular weight distribution of less than 2.30.

Paragraph S: The method of Paragraph R, where said step of maintaining the polymerization mixture within the vessel includes maintaining the polymerization mixture at a temperature greater than 130° C.

Paragraph T: The method of one or more of Paragraphs R and S, further comprising the step maintaining the polymerization mixture within the vessel at a pressure of less than 70 atm.

Paragraph U: The method of one or more of Paragraphs R-T, where said step of mixing maintains the polymerization mixture within the vessel at a temperature and pressure at a relative percent difference of less than 10%, and where said step of mixing maintains the concentration of dissolved solids within the polymerization mixture at a relative percent difference of less than 10%.

Paragraph V: The method of one or more of Paragraphs R-U, where the ethylene-based polyolefin has a molecular weight distribution (Mw/Mn) of less than 2.25.

Paragraph X: The process of one or more of Paragraphs R-W, where the first liquid phase is in the form of liquid domains having a diameter of less than 1,000 µm.

Paragraph Y: A polymer solution comprising ethylene-based polyolefin dissolved in solvent at a temperature and pressure above the lower critical separation temperature of the polymer solution, where the ethylene-based polyolefin has a molecular weight distribution, Mw/Mn, of less than 2.3, where the solution is a biphasic solution including a first liquid phase including greater than 10 wt % ethylene-based polyolefin, based on the total weight of the first liquid phase, and a second liquid phase including less than 10,000 ppm ethylene-based polyolefin, based on the total weight of the second liquid phase.

In order to demonstrate the practice of the present invention, the following examples have been prepared and tested. The examples should not, however, be viewed as limiting the scope of the invention. The claims will serve to define the invention.

EXPERIMENTAL

Polymerizations

Ethylene-based polyolefins were prepared in isohexane. In certain samples, the polymerization mixtures were maintained above the LCST, and in other samples the mixtures were maintained below the LCST.

While the polymerization mixture for all samples was generally maintained between 150 and 170° C., a first series of polymerization samples was conducted at 600 psi (40.8 atm) nominal pressure, which created a liquid-liquid biphasic polymerization mixture above the LCST, and a second series of polymerization samples was conducted at 1700 psi (115.7 atm) nominal pressure, which create a single-phase polymerization mixture below the LCST. The relevant data from the polymerization samples above the LCST (i.e. the liquid-liquid biphasic polymerization mixture) is reported in Table 1, and the relevant data from the polymerization samples below the LCST (i.e., the single-phase polymerization mixture) is reported in Table 2.

All polymerizations were performed in a continuous stirred tank reactor (CSTR) made by Autoclave Engineers, Erie Pa. The reactor was designed to operate at a maximum pressure and temperature of 2000 bar (30 kpsi) and 225° C., respectively. The nominal reactor vessel volume was 150 mL. The reactor was equipped with a magnetically coupled mechanical stirrer (Magnedrive). A pressure transducer measured the pressure in the reactor. The reactor temperature was measured using two type-K thermocouples. The reported values are the averages of the two readings. A flush-mounted rupture disk located on the side of the reactor provided protection against catastrophic pressure failure. All product lines were heated to ~120-150° C. to prevent fouling. The reactor had an electric heating band that was controlled by a programmable logic control (PLC) computer to maintain the desired reactor temperature. Except for the heat losses to the environment, the reactor did not have cooling (nearly adiabatic operations).

The conversion in the reactor was monitored by an on-line gas chromatograph (GC) that sampled both the feed and the effluent. The GC analysis utilized the ethane impurity present in the ethylene feed as internal standard.

Feed purification traps were used to control impurities carried by the monomer feed. The purification traps were placed before the ethylene feed compressor and comprised of two separate beds in series: activated copper (reduced in flowing $H_2$ at 225° C. and 1 bar) for $O_2$ removal followed by a molecular sieve (5A, activated in flowing $N_2$ at 270° C.) for water removal.

Purified liquid monomer feed was fed by a single-barrel ISCO pump (model 500D) in neat form or diluted by the same solvent as used in polymerization. The liquid monomer feeds were purified by filtration through an activated basic alumina bed followed by the addition of ~3 mL of trioctylaluminum solution (Aldrich #38,655-3)/2 L of liquid monomer feed.

All polymerizations were conducted using a single-site catalyst that was prepared as a pre-formed activated catalyst by combining dimethyl-(m-di(p-triethylsilylphenyl)silyl)(3, 8-di-tert-butylfluorenyl-indenyl)hafnium (F3-Hf-Me$_2$) transition metal precursor with dimethylanilinium-tetrakis(pentafluorophenyl)borate (D4) activator precursor.

The catalyst feed solution was prepared inside an argon-filled dry box (Vacuum Atmospheres). The atmosphere in the glove box was purified to maintain <1 ppm $O_2$ and <1 ppm water. All glassware was oven-dried for a minimum of at least 4 hours at 110° C. and transferred hot to the antechamber of the dry box before bringing them to the box. Stock solutions of the catalyst precursor and the activator were prepared using purified toluene that was stored in amber bottles inside the dry box. Aliquots were taken to prepare fresh activated catalyst solutions. The activated catalyst solution was charged inside the argon-filled dry box to a heavy-walled glass reservoir (Ace Glass, Inc. Vineland, N.J.) and was pressurized to 5 psig with argon to send it to the catalyst feed pump in a closed line. The activated catalyst solution was delivered to the unit by a two-barrel continuous high-pressure syringe pump (PDC Machines).

HPLC grade hexane (95% n-hexane, J.T. Baker) or isohexane (South Hampton Resources, Dallas, Tex.) was used as solvent. It was purged with argon for a minimum of four hours and was sent through an activated copper and a molecular sieve (5A) bed, then filtered once over activated basic alumina. The filtered hexane or isohexane was stored in a heavy-wall 4-liter glass vessel (Ace Glass, Vineland, N.J.) inside an argon-filled dry box. The solvent feed was further purified by adding ~3-5 mL of trioctylaluminum solution (Aldrich #38,655-3) to the 4-liter reservoir of filtered hexane. 5-10 psig head pressure of argon was applied to the glass vessel to send the scavenger-containing hexane to a metal feed vessel from which the hexane was delivered to the reactor by a two-barrel continuous ISCO pump (model 500D).

During the polymerizations, the reactor was first preheated to ~10-15° C. below that of the desired reaction temperature. Once the reactor reached the preheat temperature, the solvent pump was turned on to feed the solvent to the reactor. This solvent stream entered the reactor through a port on the top of the stirrer assembly to keep the polymer from fouling the stirrer. The monomers were fed to the reactor through a single side port. The activated catalyst solution was fed by syringe pump. The catalyst solution was mixed with the stream of flowing solvent upstream of the reactor. During the reactor line-out period the catalyst feed rate was adjusted to reach and maintain the target monomer conversion, the latter of which monitored by GC sampling. After establishing steady state reactor conditions during which all process parameters, feed rates, and monomer conversions were constant, the products were collected in a dedicated collection vessel for a time sufficient to collect the desired amounts of product. This stage of the run was called the balance period as it was used to collect the product while measuring and recording the exact feed flow rates and the length of the run. The polymer made during the balance period under steady state conditions was collected at the end of each run and weighed after vacuum-drying overnight at 50-70° C. The total feed during the balance period combined with the product yield and composition data were used to compute monomer concentrations and monomer conversions. Aliquots of the products were used for characterization without homogenizing the entire product yield.

TABLE 1

| | Reactor Conditions | | | | | | | | | |
|---|---|---|---|---|---|---|---|---|---|---|
| | Reactor Temperature | | | | | | | | | |
| | Upper | Lower | ΔT = lower-upper | avg. | Above (+) or Below (−) the LCST | Press. | $C_8F_{18}$ Feed | Total Solvent Feed | $C_2$ = Feed (solvent included) | |
| Sample # | °C. | °C. | °C. | °C. | °C. | atm | wt % | wt % | g/min | wt % |
| 26933-047 | 157 | 153 | −4 | 155 | 12 | 43.2 | 0.0182 | 88.4 | 1.10 | 11.59 |
| 26933-053 | 166 | 164 | −2 | 165 | −2 | 44.0 | 0.021 | 88.4 | 1.10 | 11.59 |
| 26933-054 | 166 | 164 | −1 | 165 | 3 | 44.0 | 0.0217 | 91.3 | 0.80 | 8.70 |
| 26933-055 | 166 | 164 | −2 | 165 | 8 | 43.8 | 0.0217 | 91.3 | 0.80 | 8.71 |
| 26933-041 | 156 | 154 | −2 | 155 | 23 | 41.1 | 0.0125 | 87.8 | 1.10 | 11.52 |
| 26933-042 | 158 | 152 | −6 | 155 | 5 | 39.9 | 0.0125 | 87.8 | 1.10 | 11.51 |
| 26933-048 | 157 | 153 | −4 | 155 | 6 | 42.6 | 0.0126 | 88.3 | 1.10 | 11.58 |
| 26933-049 | 156 | 154 | −2 | 155 | −2 | 42.1 | 0.0181 | 88.2 | 1.10 | 11.56 |
| 26933-050 | 157 | 153 | −4 | 155 | 4 | 42.1 | 0.0182 | 88.2 | 1.10 | 11.57 |

| | Reactor Conditions | | Product | | | | | | |
|---|---|---|---|---|---|---|---|---|---|
| | Octene-1 feed (solvent included) | Polymer in the Reactor | MI | Melting (first) | | Melting (second) | | Mw by LS By GPC | Mw/Mn by DRI |
| Sample # | g/min | wt % | g/10 min | Peak °C. | ΔH$_f$ J/g | Peak °C. | ΔH$_f$ J/g | kg/mol | — |
| 26933-047 | 0.000 | 0.000 | 10.7 | 3.1 | 126.0 | 146.1 | 127.5 | 174.4 | 65.29 | 2.01 |
| 26933-053 | 0.000 | 0.000 | 10.8 | 291.5 | 122.7 | 166 | 123.7 | 186.6 | 19.95 | 2.32 |
| 26933-054 | 0.000 | 0.000 | 8.1 | 68.9 | 123 | 169.1 | 123.7 | 187.3 | 24.91 | 2.38 |
| 26933-055 | 0.000 | 0.000 | 8.0 | 104.8 | 123.3 | 164.8 | 124.5 | 188.2 | 28.87 | 2.23 |
| 26933-041 | 0.063 | 0.66 | 9.9 | 38.7 | 115.4 | 114.6 | 114.8 | 135.7 | 40.22 | 2.09 |
| 26933-042 | 0.063 | 0.659 | 11.7 | 23.1 | 115.8 | 121.6 | 115.3 | 137.3 | 40.27 | 2.18 |
| 26933-048 | 0.016 | 0.168 | 11.1 | 1.8 | 123.1 | 136.8 | 124.3 | 157.7 | 55.02 | 2.09 |
| 26933-049 | 0.023 | 0.242 | 11.3 | 83.8 | 121.2 | 145.1 | 121.3 | 160.9 | 38.14 | 2.06 |
| 26933-050 | 0.023 | 0.242 | 11 | 12.9 | 121.7 | 130.0 | 122.6 | 149.8 | 47.64 | 2.01 |

TABLE 2

| | Reactor Conditions | | | | | | | | | |
|---|---|---|---|---|---|---|---|---|---|---|
| | Reactor Temperature | | | | | | | | | |
| | Upper | Lower | ΔT = lower-upper | avg. | Press. | $C_8F_{18}$ Feed | Total Solvent Feed | $C_2$ = Feed (solvent included) | | Octene-1 feed (solvent included) |
| Sample # | °C. | °C. | °C. | °C. | Atm | wt % | wt % | g/min | wt % | g/min |
| 26933-056 | 157 | 154 | −3 | 155 | 115.6 | 0.0184 | 88.4 | 1.10 | 11.59 | 0.000 |
| 26933-057 | 157 | 154 | −3 | 155 | 116.8 | 0.0184 | 88.4 | 1.10 | 11.59 | 0.000 |
| 26933-058 | 156 | 154 | −3 | 155 | 118.5 | 0.0184 | 88.4 | 1.10 | 11.59 | 0.000 |
| 26933-059 | 156 | 154 | −2 | 155 | 116.9 | 0.0184 | 88.4 | 1.10 | 11.58 | 0.000 |
| 26933-060 | 156 | 154 | −2 | 155 | 115.6 | 0.0184 | 88.4 | 1.10 | 11.59 | 0.000 |
| 26933-061 | 156 | 154 | −3 | 155 | 118.5 | 0.0184 | 88.4 | 1.10 | 11.59 | 0.000 |
| 26933-044 | 158 | 152 | −6 | 155 | 116.5 | 0.0184 | 88.2 | 1.10 | 11.57 | 0.023 |

| | Reactor Conditions | | Product | | | | | | |
|---|---|---|---|---|---|---|---|---|---|
| | Octene-1 feed (solvent included) | Polymer Cement | MI | Melting (first) | | Melting (second) | | Mw by LS By GPC | Mw/Mn by DRI |
| Sample # | wt % | wt % | g/10 min | Peak °C. | ΔH$_f$ J/g | Peak °C. | ΔH$_f$ J/g | kg/mol | |
| 26933-056 | 0.000 | 10.9 | 4.7 | 125.1 | 148.9 | 127.2 | 175.0 | 40.000 | 2.22 |
| 26933-057 | 0.000 | 11.0 | 21.4 | 124.1 | 155.9 | 125.4 | 182.0 | 38.731 | 2.16 |
| 26933-058 | 0.000 | 10.9 | 26.9 | 124.6 | 150.6 | 126.2 | 180.1 | 38.403 | 2.16 |
| 26933-059 | 0.000 | 11.2 | 12.5 | 124.6 | 149.5 | 126.3 | 176.6 | 48.630 | 2.13 |

TABLE 2-continued

| | | | | | | | | | |
|---|---|---|---|---|---|---|---|---|---|
| 26933-060 | 0.000 | 11.0 | 41.9 | 123.9 | 157.4 | 125.1 | 183.4 | 31.917 | 2.02 |
| 26933-061 | 0.000 | 11.1 | 48.3 | 124.6 | 147.9 | 126.3 | 117.1 | 34.767 | 2.05 |
| 26933-044 | 0.242 | 11.4 | 22.7 | 118.8 | 127.8 | 118.8 | 145.8 | 40.419 | 2.14 |

DSC Analysis

The heat associated with phase transitions was measured on heating and cooling the polymer samples from the solid state and melt, respectively, using a TA Instruments Discovery series DSC. The data were analyzed using the analysis software provided by the vendor. Typically, 3 to 10 mg of polymer was placed in an aluminum pan and loaded into the instrument at room temperature. The sample was cooled to −40° C. and then heated to 210° C. at a heating rate of 10° C./min to evaluate the glass transition and melting behavior for the as-received polymers. Crystallization behavior was evaluated by cooling the sample from 210 to −40° C. at a cooling rate of 10° C./min. Second heating data were measured by heating this melt-crystallized sample at 10° C./min. The second heating data thus provide phase behavior information for samples crystallized under controlled thermal history. The endothermic melting transition (first and second melt) and exothermic crystallization transition were analyzed for onset of transition and peak temperature. The melting temperatures are the peak melting temperatures from the second melt unless otherwise indicated. Areas under the DSC curve were used to determine the heat of fusion ($\Delta H_f$).

Melt Index (MI)

The Melt Flow Rate (MFR) of the polymers was determined by using Dynisco Kayeness Polymer Test Systems Series 4003 apparatus following ASTM D1238 and ISO 1133 methods. The protocol for the measurement is described in the Series 4000 Melt Indexer Operation manual, Method B.

Gel Permeation Chromatography (GPC)

The molecular weights and Mw/Mn values were determined using GPC with triple detector using techniques described hereinabove. Specifically, the instrument was an Agilent PL 220 GPC pump and autoliquid sampler with the Wyatt HELEOS-II detector system, 10 μm PD; the column was a 3 PLGel Mixed "B" (linear range from 500 to 10,000,000 MW PS) having a length of 300 mm and an I.D. of 7.5 mm; the three detectors, which were in series, included 18 angles LS, DRI, and Viscometer; the solvent program was 1.0 ml/min inhibited TCB (1500 ppm BHT 2,4-tert-butyl-6-methyl phenol in 1,2,3-trichlorobenzene; the column, detector and injector were set at 145° C.

Modeling of Polymerization Medium

In the foregoing samples, the characterization of the biphasic polymerization medium was be modeled to determine whether the reaction conditions created a single liquid solution or a liquid-liquid biphasic media. In performing this analysis, the feed monomer content, flow rate, and reactor productivity were maintained within a tight range, which ensured comparable reactor compositions. Two reactor pressures, nominally about 40.8 and about 115.7 atm (41 and 117 bar, respectively), were used to switch between biphasic liquid and single liquid phases.

The variant of the statistical associating fluid theory (SAFT) that was used to predict the phase diagrams was SAFT-1, which is described in H. Adidharma and M. Radosz, Ind. Eng. Chem. Res. 1998, 37, 4453-4462. To calculate the phase boundaries, the tangent plane criterion was applied to the Gibbs free energy as defined by SAFT-1:

$$G_{Mix}(\vec{x}_{Feed}+\Delta\vec{x})-G_{Mix}(\vec{x}_{Feed})-\nabla G(\vec{x}_{Feed})\cdot\Delta\vec{x} \geq 0$$

$\vec{x}$ = Feed Composition $\Delta\vec{x}$ = All possible mixtures

For the polyethylene component, the SAFT-1 parameters were used (H. Adidharma and M. Radosz, Ind. Eng. Chem. Res. 1998, 37, 4453-4462):

$m = 0.023763 \times Mn + 0.618823$ $v^{00} = (0.599110 \times Mn + 4.640260)/m$ $\mu^0/k_B = (6.702340 \times Mn + 19.67793)/m$ $\lambda^0 = (0.039308 \times Mn + 1.104297)/m$ where Mn is the number average molecular weight and the SAFT-1 parameters are defined in the reference above. For the small molecules, the values reported in Table 3 below were used, which values were obtained by Supercritical Fluids Inc. (Wyoming).

The cloud point experiments, which were conducted by using the HDPE control NIST 1484 Supercritical Fluids, established that the polyethylene/isohexane $k_{ij}$ interaction parameter is −0.00433; and the polyethylene/propylene interaction parameter is 0.032269-5.34E-5T; and the isohexane/propylene parameter is −0.01. It was assumed that ethylene had equivalent interaction parameters as propylene, and based upon this assumption, the parameters in the Table 4 below were used for ethylene. Interaction parameters not listed in the above table were assumed to be zero.

A comparison of the results listed in Table 1 and Table 2 demonstrates that ethylene-based polyolefins with a narrow molecular weight distribution can be produced in a liquid-liquid biphasic reaction media so as long as the appropriate process conditions are maintained; i.e., a uniform polymerization mixture operating at steady state is maintained. These calculations also show that the molecular weight distribution of ethylene-based polyolefins is not affected by the presence or absence of C3+ comonomers in a liquid-liquid biphasic reaction medium, and therefore both homo- and copolymers with narrow molecular weight distribution (Mw/Mn) can be made.

The SAFT model results also indicated that all trials performed at about 115.7 atm, which are shown in Table 2, were in the single liquid phase regime since the 155° C. run temperature was at least 50° C. below the lower critical phase separation temperature (LCST). The trials performed at about 40.8 atm reactor pressure were most often above the LCST (see Table 1), and thus the polymers were made in a liquid-liquid biphasic reaction medium. Yet, for the polymers made in a liquid-liquid biphasic reaction medium (or above the LCST), the molecular weight distribution (Mw/Mn) remained narrow (Mw/Mn<2.4) and DSC analyses showed a single, sharp melting peak indicating narrow composition distribution. Therefore, the liquid-liquid biphasic process can produce polymers with narrow molecular weight and narrow compositional distribution.

TABLE 3

SAFT-1 parameters for small molecules

| Component | Molecular Weight | M | $v^{\infty} = N_A \sigma^3/\sqrt{2}$ | $\mu^\circ/k_B$ | $\lambda^\circ$ |
|---|---|---|---|---|---|
| Isohexane | 86.18 | 2.5666 | 21.7896 | 220.1542 | 1.6907 |
| Ethylene | 44.1 | 1.4578 | 13.9127 | 138.8488 | 1.7535 |
| Octane | 114.23 | 3.333 | 21.897 | 236.923 | 1.6758 |
| Toluene | 92.14 | 2.182 | 21.969 | 307.801 | 1.6442 |

Octane SAFT-1 parameters were used for octene.

TABLE 4

SAFT-1 interaction parameters required to calculate the dispersion term

| Component 1 | Component 2 | $k_{ij}$ intercept | $k_{ij}$ slope |
|---|---|---|---|
| Polyethylene | Isohexane | −0.00433 | 0 |
| Polyethylene | Ethylene | 0.032269 | −5.34E−05 |
| Isohexane | Ethylene | −0.01 | 0 |

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group consisting of," or "I" preceding the recitation of the composition, element, or elements and vice versa, e.g., the terms "comprising," "consisting essentially of," "consisting of" also include the product of the combinations of elements listed after the term.

Various modifications and alterations that do not depart from the scope and spirit of this invention will become apparent to those skilled in the art. This invention is not to be duly limited to the illustrative embodiments set forth herein.

What is claimed is:

1. A continuous process for preparing an ethylene-based polyolefin, the process comprising:
   maintaining a polymerization mixture at a temperature at or above the lower critical phase separation temperature of the polymerization mixture, while, during said step of maintaining, maintaining the polymerization mixture at steady state, where the polymerization mixture is substantially uniform in temperature, pressure, and concentration, where the polymerization mixture includes solvent, monomer including ethylene and optionally monomer copolymerizable with ethylene, a single-site catalyst system, and polymer resulting from the polymerization of the monomer, where the monomer and the polymer are dissolved in the solvent, and where the polymer is an ethylene-based polyolefin having a molecular weight distribution (Mw/Mn) of less than 2.30.

2. The process of claim 1, where said step of maintaining a polymerization mixture includes maintaining the polymerization mixture at a pressure of less than 70 atm.

3. The process of claim 1, where said step of maintaining a polymerization mixture includes maintaining the polymerization mixture at a pressure of less than 50 atm.

4. The process of claim 1, where said step of maintaining a polymerization mixture includes maintaining the polymerization mixture at a temperature greater than 130° C.

5. The process of claim 1, where said step of maintaining a polymerization mixture includes maintaining the polymerization mixture at a temperature greater than 150° C.

6. The process of claim 1, where, during said step of maintaining, maintaining the polymerization mixture at temperature fluctuations of less than 15° C.

7. The process of claim 1, where, during said step of maintaining, maintaining the polymerization mixture at temperature fluctuations of less than 10° C.

8. The process of claim 1, where, during said step of maintaining, maintaining the polymerization mixture at pressure fluctuations of less than 10 atm.

9. The process of claim 1, where, during said step of maintaining, maintaining the polymerization mixture at pressure fluctuations of less than 7 atm.

10. The process of claim 1, where, during said step of maintaining, maintaining the temperature and pressure of the polymerization mixture at a relative percent difference of less than 10%.

11. The process of claim 1, where, during said step of maintaining, maintaining the temperature and pressure of the polymerization mixture at a relative percent difference of less than 6%.

12. The process of claim 1, where the ethylene-based polyolefin has a molecular weight distribution (Mw/Mn) of less than 2.25.

13. The process of claim 1, where the ethylene-based polyolefin has a molecular weight distribution (Mw/Mn) of less than 2.20.

14. The process of claim 1, where the single-site catalyst is prepared by combining a metallocene compound and an activator compound.

15. The process of claim 1, where the polymerization mixture is biphasic liquid-liquid system including a first liquid phase dispersed within a second liquid phase.

16. The process of claim 15, where the first liquid phase is in the form of liquid domains having a diameter of less than 1,000 μm.

17. The process of claim 16, where the first liquid phase is in the form of liquid domains having a diameter of less than 100 μm.

18. A method for preparing ethylene-based polyolefin, the method comprising:
   (i) providing a polymerization vessel;
   (ii) continuously charging the polymerization vessel with monomer including ethylene and olefin monomer copolymerizable with ethylene, a solvent, and a single-site catalyst system, to thereby form a polymerization mixture;
   (iii) maintaining the polymerization mixture within the vessel at a temperature at or above the lower critical phase separation temperature of the polymerization mixture;
   (iv) mixing the polymerization mixture within the vessel so that the temperature, pressure, and concentration of the polymerization mixture within the vessel is substantially uniform; and (v) continuously removing monomer, polymer formed by the polymerization of monomer, solvent, and single-site site catalyst system from the polymerization vessel at a rate substantially constant to the rate of continuously charging monomer, a solvent, and a single-site catalyst system, where the polymer continuously removed from the polymerization mixture is ethylene-based polyolefin having a molecular weight distribution of less than 2.30.

19. The method of claim 18, where said step of maintaining the polymerization mixture within the vessel includes maintaining the polymerization mixture at a temperature greater than 130° C.

20. The method of claim 18, further comprising the step maintaining the polymerization mixture within the vessel at a pressure of less than 70 atm.

21. The method of claim 18, where said step of mixing maintains the polymerization mixture within the vessel at a temperature and pressure at a relative percent difference of less than 10%, and where said step of mixing maintains the concentration of dissolved solids within the polymerization mixture at a relative percent difference of less than 10%.

22. The method of claim 18, where the ethylene-based polyolefin has a molecular weight distribution (Mw/Mn) of less than 2.25.

23. The process of claim 18, where the single-site catalyst is prepared by combining a metallocene compound and an activator compound, and where the polymerization mixture is biphasic liquid-liquid system including a first liquid phase dispersed within a second liquid phase.

24. The process of claim 23, where the first liquid phase is in the form of liquid domains having a diameter of less than 1,000 μm.

25. A polymer solution comprising:
ethylene-based polyolefin dissolved in solvent at a temperature and pressure above the lower critical separation temperature of the polymer solution, where the ethylene-based polyolefin has a molecular weight distribution, Mw/Mn, of less than 2.3, where the solution is a biphasic solution including a first liquid phase including greater than 10 wt % ethylene-based polyolefin, based on the total weight of the first liquid phase, and a second liquid phase including less than 10,000 ppm ethylene-based polyolefin, based on the total weight of the second liquid phase.

* * * * *